United States Patent [19]

Bradley

[11] 3,906,173

[45] Sept. 16, 1975

[54] TELEPHONE LINE CHARACTERISTIC MEASURING INSTRUMENT AND DISPLAY

[76] Inventor: Frank R. Bradley, 9 Dash Pl., Bronx, N.Y. 10463

[22] Filed: Mar. 27, 1974

[21] Appl. No.: 455,197

[52] U.S. Cl. .......... 179/175.3 R

[51] Int. Cl.[2] .......... H04B 3/46

[58] Field of Search .......... 179/175.3 R; 333/70 R, 333/70 A; 325/67, 133; 328/162; 324/95, 79 R, 82, 57 DE, 121 R

[56] References Cited

UNITED STATES PATENTS

| | | | |
|---|---|---|---|
| 2,767,373 | 10/1956 | Maggio | 324/57 DE |
| 3,213,196 | 10/1965 | Tuck et al. | 324/57 D |
| 3,814,868 | 6/1974 | Bradley | 179/175.3 R |
| 3,836,735 | 9/1974 | Bradley | 179/175.3 R |

*Primary Examiner*—Kathleen H. Claffy
*Assistant Examiner*—Douglas W. Olms
*Attorney, Agent, or Firm*—Gottlieb, Rackman, Reisman & Kirsch

[57] ABSTRACT

There is disclosed a telephone line characteristic measuring instrument of the type described in my application Ser. No. 270,953, now U.S. Pat. No. 3,814,868, provided with an oscilloscope display. A signal representing the instantaneous in-phase component of the total disturbance on a received test tone is applied to one set of deflection plates, and a signal representing the instantaneous quadrature component of the total disturbance on the received test tone is applied to the orthogonal deflection plates. The resulting display is a function of the disturbances only. Without requiring the use of a test modem, the oscilloscope trace identifies the source of a disturbance (e.g., amplitude modulation, phase modulation, phase hits, white noise, etc.), and in addition allows quantitative measurements to be taken from a graticule provided over the screen.

24 Claims, 14 Drawing Figures

TELEPHONE LINE CHARACTERISTIC MEASURING INSTRUMENT AND DISPLAY

This invention relates to telephone line characteristic measuring instruments and displays, and more particularly to such instruments and displays which facilitate the identification of sources of data transmission errors.

In my co-pending application Ser. No. 270,953, filed on July 12, 1972, now U.S. Pat. No. 3,814,868 issued on June 4, 1974, and entitled "Telephone Line Characteristic Measuring Instrument," which application is hereby incorporated by reference, there is disclosed an improved apparatus for facilitating the identification of sources of data transmission errors. As described in detail therein, a test tone is transmitted and at the end of the transmission path the signal is normalized so that its test tone component is a reference value. The test tone is removed from the uncorrelated background noise and other disturbances, and the disturbances are operated upon directly. By first subtracting a replica of the test tone from the normalized received signal, only the periodic and noise components which are of diagnostic interest remain to be processed.

The test tone signal which is transmitted over the communication channel is a single frequency signal of the form Acos(wt). The received signal V, in the absence of non-linear distortion products, can be expressed as follows:

$$V=AG(w)\ [l+m(t)]\cos(wt+\theta(t))+n(t).$$

In this equation, $G(w)$ is the channel amplitude characteristic at the frequency of the test tone and is a measure of the loss of the channel at the test frequency, $m(t)$ is the incidental amplitude modulation, $\theta(t)$ is the incidental phase modulation and includes all of the AC components which cause the zero-crossings of a signal to "jitter" (often referred to as "phase jitter"), and $n(t)$ is the total uncorrelated interference (noise).

The received signal is normalized and the test tone is "notched out" from it. Thereafter, what is left of the signal is multiplied by cos(wt) and sin(wt) signals to generate instantaneous in-phase and quadrature components of the notched-noise signal (the received signal after the test tone is notched out). The notched-noise signal includes coherent components (amplitude and phase modulation, and amplitude and phase hits) as well as non-coherent components (background noise, single frequency interference and impulse hits). It is the multiplication of the notched-noise signal by the sine and cosine functions that effectively isolates the amplitude modulation and phase modulation components. After the two signals are passed through respective 20–300 Hz filters, there results two signals in the following forms:

$$(\tfrac{1}{2})m(t)+[n(t)/AG(w)]\cos(wt)$$

and $$(-\tfrac{1}{2})\theta(t)+[n(t)/AG(w)]\sin(wt).$$

The first expression represents the instantaneous in-phase component of the total disturbance (in the 20–300 Hz band of interest) on the received test tone; the first term in the expression represents the amplitude modulation component, and the second term in the expression represents the instantaneous in-phase component of the normalized noise on the received test tone. Similarly, the second expression represents the instantaneous quadrature component of the total disturbance (in the 20–300 Hz band of interest) on the received test tone; the first term in the expression represents the instantaneous phase modulation component, and the second term represents the instantaneous quadrature component of the normalized noise on the received test tone.

Neither expression is an exact representation of the parameters of interest. This is due to the fact that certain simplifying assumptions were made in my above-identified application in the derivation of the expressions. Nevertheless, the two expressions are substantially correct representations of the signal components described above; when measurements are taken of them, the measurements provide not only qualitative information concerning the distortion introduced by the transmission path, but substantially correct quantitative information as well.

In my above-identified application, the two resultant signals are measured, e.g., by peak detectors. When the measurements are properly interpreted, the sources of data transmission errors can be identified. I have discovered, however, that the signals can be used simultaneously to form a display, preferably on an oscilloscope, in a way such that immediate identification of transmission problems can be determined.

Accordingly, it is an object of the present invention to provide a display to be used in conjunction with a telephone line characteristic measuring instrument which facilitates a rapid determination of transmission path performance.

The key to an understanding of the present invention is the realization that the two resultant signals referred to above represent in-phase and quadrature components of the total disturbance on the received test tone (without the test tone itself). The two signals are applied to the orthogonal deflection controls of a cathode ray tube (oscilloscope). In the absence of any disturbance whatsoever, a spot appears on the oscilloscope. If the display is conceived to represent the trace formed by orthogonal "disturbance" vectors, in the absence of any disturbance all that is seen is the tip of the tone vector at the origin of the display. But if any disturbances are present, the spot position on the display represents the combined instantaneous disturbance of the tone in both phase and amplitude. If the display is suitably calibrated, not only are quantitative measurements of amplitude jitter, phase and sideband energy immediately available, but the major sources of disturbances are immediately evident.

Further objects, features and advantages of my invention will become apparent upon consideration of the following detailed description in conjunction with the drawing, in which.

Figure 1:
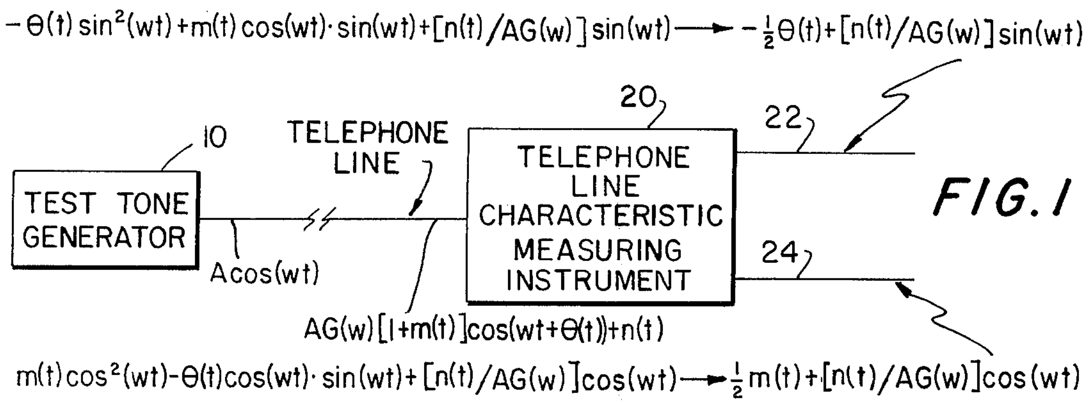
FIG. 1 is a block-diagram representation of the manner in which test measurements are made in accordance with the principles of my above-identified application and shows the two resultant signals which are derived.

As shown in FIG. 1, a test tone generator 10 applies a test tone of the form Acos(wt) to a telephone line. The received signal is applied to the input of telephone line characteristic measuring instrument 20, the instrument which is described in my above-described application. The instrument processes the received signal, including multiplying it by sine and cosine signals, to derive two complex signals of the forms indicated. After filtering, these signals reduce (as symbolized by the two horizontal arrows in FIG. 1) to the two resultant signals indicated in FIG. 1 and described above. These two signals appear on respective conductors 22 and 24.

Figure 2:
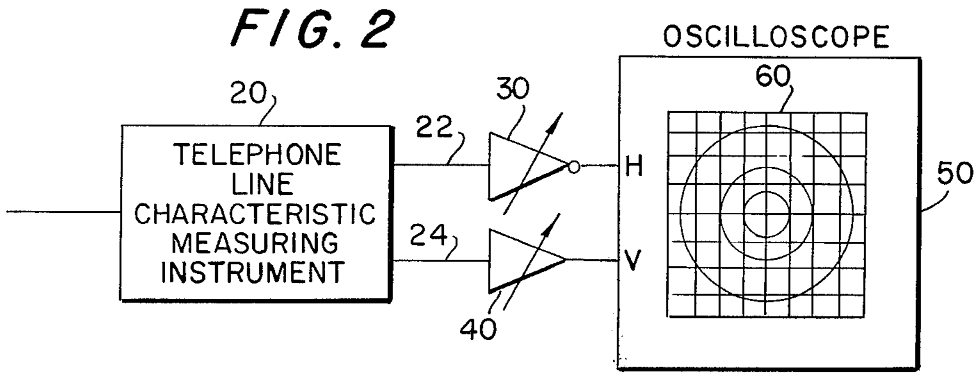
FIG. 2 depicts an illustrative embodiment of the present invention, in which the resultant signals of FIG. 1 are applied through respective amplifiers to the horizontal and vertical deflection controls of an oscilloscope.
Figure 3:
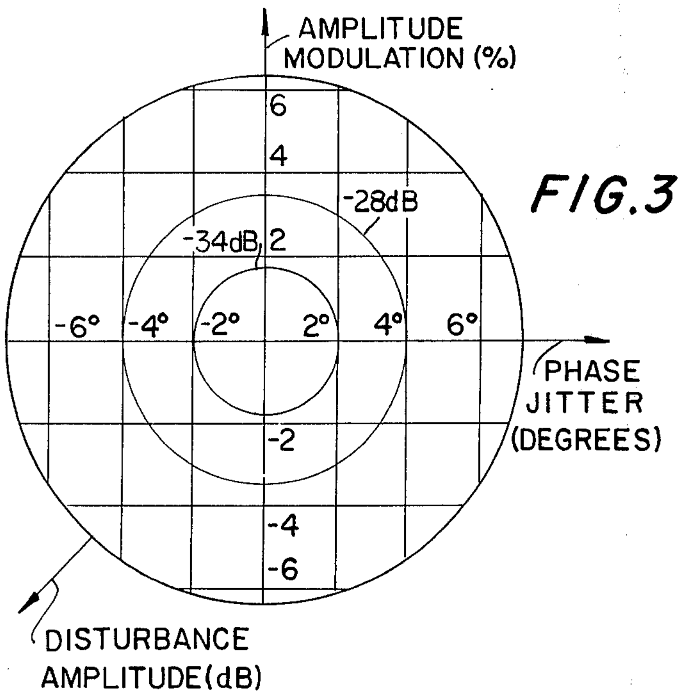
FIG. 3 depicts the graticule which is placed on the oscilloscope display.

As shown in FIG. 2, the two output conductors 22 and 24, in accordance with the principles of the present invention, are applied to the inputs of respective amplifiers 30 and 40. Amplifier 30 is an inverting amplifier so that the minus sign in the expression for the phase modulation in the signal on conductor 22 is eliminated. (The fact that the second term in the expression for the signal on conductor 22 now has a minus sign in front of it is of no moment; the noise component is of a continuous random oscillating form in the first place.) After amplification, the two signals are applied to the horizontal and vertical deflection inputs of oscilloscope 50. The gains of the two amplifiers are adjustable and are pre-set in a manner which will be described below. The graticule 60 of the oscilloscope is shown in FIG. 3. The graticule markings, as well as how the amplifier gains should be adjusted, will become apparent after some illustrative examples are considered.

Before considering these examples, however, it is important to recall that the instrument 20 is illustratively provided with 20–300 Hz passband filters in the channels which derive the two signals on conductors 22 and 24. These filters are incorporated in the system because disturbance frequency components in this passband are of the primary concern.

The first example is the case in which there is no amplitude or phase modulation. Instead, what is received is the test tone together with single frequency interference. For example, the test tone might be 1 KHz, and the interfering tone might be 900 Hz. With respect to the two signals on conductors 22 and 24, the $m(t)$ and $\theta(t)$ components are 0. Each signal consists of a 900-Hz "noise" tone multiplied by either a sine signal or a cosine signal having a frequency of 1 KHz. Each signal is thus a product of two sine (cosine) waves of frequencies 900 Hz and 1 KHz; all that gets through the 20–300 Hz passband filter in each channel is a difference frequency of 100 Hz. Two identical sine wave signals are thus applied to the two deflection circuits except that they are out of phase from each other by 90°. Were the instrument "ideal", a circle would result on the display. The circle is formed by the electron beam rotating around at the rate of 100 revolutions per second, corresponding to the beat frequency of 100 Hz. While this rotation cannot be seen, the circle (FIG. 4) which is displayed is a clear indication of single frequency interference.

It will be apparent to those skilled in the art that any amplitude of a single frequency interfering tone, as measured in dB relative to the test tone, corresponds to pairs of phase modulation (phase jitter) and percent amplitude modulation values which, with appropriate scales, fall on a respective circle as shown in FIG. 3. In setting up the instrument, the gains of amplifiers 30 and 40 are adjusted so that with a specific amplitude single frequency interference, a circle is displayed which is coincident with the respective circle on the graticule and which has the correct diameter, e.g., 10 percent frequency interference is equivalent to −20dB and also 11.5°. Once the amplifiers are preset in this manner, the instrument is properly calibrated.

Figure 4:
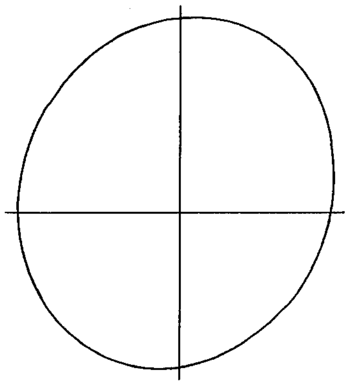
FIGS. 4–14 depict several different forms of display which result for various types of disturbances.

With reference to FIG. 4, it will be noted that the display is not a perfect circle. That is due primarily to typical filter mismatches in the two channels. Nevertheless, the display is close enough to a true circle to indicate the presence of single frequency interference.

Figure 5:
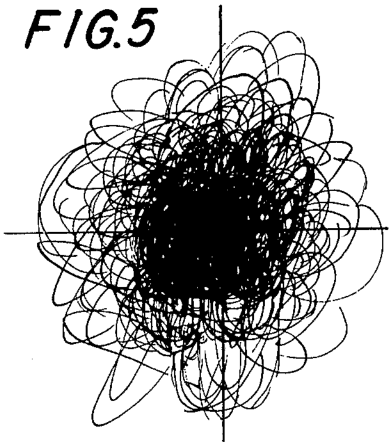

FIG. 5 depicts the display which results when the only interference on the test tone is voiceband white noise. In such a case, the deflection signal for each pair of plates is a continuously varying random signal. The electron beam thus traces out a random pattern centered on the origin. When such a pattern is viewed, it is an indication that there is no substantial amplitude or phase modulation, or single frequency interference.

Figure 6:
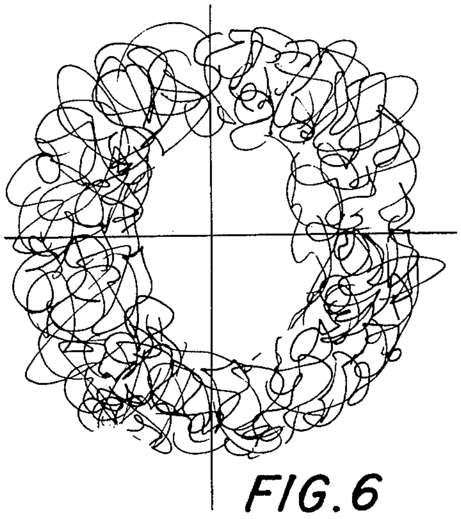

FIG. 6 depicts the form of the display when there is both single frequency and white noise interference. In effect, the single frequency interference causes the electron beam to trace out a circle, but there are random excursions from the true circular path. In a sense, the display of FIG. 6 is the "sum" of the displays of FIGS. 4 and 5. Whenever the display depicts a random trace having somewhat of a donut configuration, it is an indication that there are both single frequency and white noise disturbances on the line.

Figure 7:
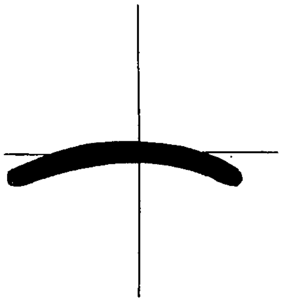

The next example is the case of pure phase modulation. In such a case, there is no signal applied to the vertical deflection plates; theoretically, the display is a horizontal line. In terms of vector analysis, phase modulation may be understood in terms of its effect on the test tone vector. The test tone vector rotates around the origin, with the projection on the horizontal axis representing the instantaneous value of the test tone. But if phase jitter is present, what happens is that the test tone vector, as it rotates, also oscillates around its true position at all times. To talk about phase jitter meaningfully, the limits of the vector oscillation must be specified. For example, the test tone vector might oscillate around its true position by 10° in either direction at a rate, for example, of 90 cycles per second. With reference to my display, there should appear a circle arc along the horizontal axis within the limits −10° and +10°. (The jitter rate has no effect on the display; it simply determines the rate at which the horizontal line is drawn.) In actuality, what is seen is a display of the form shown in FIG. 7. Any departure from the ideal display is attributable to minor instrumentation errors which are difficult to avoid in practice, e.g., filter mismatches in the two channels. Nevertheless, the display of FIG. 7 approximates a circle arc, and is an indication that the problem present on the path is one of phase jitter. The bounds along the phase jitter (horizontal) axis on either side of the origin are a measure of the magnitude of the phase jitter.

Figure 8:
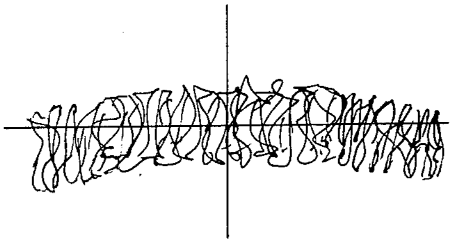

FIG. 8 depicts the form of the display when the interference consists of phase jitter together with white noise. The display is similar to that of FIG. 7 except that the noise components in both channels cause the circle arc display to be smeared. The display is clearly distinguishable from those of FIGS. 5 and 6. While noise is clearly present, because the random trace is flattened out along the horizontal axis, it is an indication that in addition to noise, phase jitter disturbances are also present.

Figure 9:
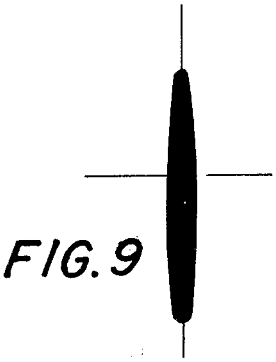

If the only disturbance is amplitude modulation, then no signal is applied to the horizontal deflection plates. The trace consists simply of a vertical line along the amplitude modulation axis. A typical display which results for the case of pure amplitude modulation is shown in FIG. 9. The limits of the "line" along the vertical axis represent the percentage of the modulation component relative to the test tone.

Figure 10:
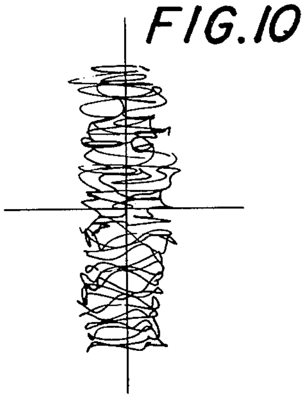

FIG. 10 depicts the same case as that depicted in FIG. 9, with the addition of white noise. The relationship between FIGS. 9 and 10 is analogous to that between FIGS. 7 and 8. Once again, it is the general form of the display which is of significance. A random flattened noise pattern in the vertical direction indicates the presence of both amplitude modulation and white noise, with the limits along the vertical axis representing the percentage of amplitude modulation relative to the test tone (although the limits are not clearly defined due to the presence of the noise).

Figure 11:
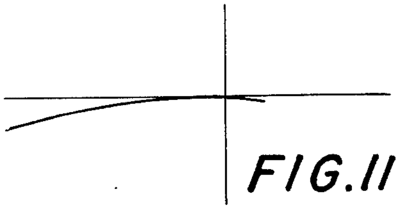

A phase hit, as it is commonly called, is a situation in which the phase of the test tone changes suddenly. The effect is similar to that of phase jitter (FIG. 7) except that the test tone vector jumps suddenly and then continues its orderly rotation about the origin. The display which results is of the form shown in FIG. 11. Most important is the fact that the trace does not persist. In the case of continuous phase jitter a trace is continuously formed because the phase jitter is continuously present. In the case of a phase hit, since it is a momentary phenomenon, the electron beam is simply deflected along the horizontal axis and it then returns immediately to the origin. Because the display is not continuous, the number of phase hits can actually be counted as a function of time. A phase hit, due to its momentary nature and the clearly defined line which results from it on the screen, is easily distinguishable from phase jitter. (The small excursion to the right side of the vertical axis is a result of overshoot in a typical phase tracking loop.)

Very often, a phase hit in one direction is followed by another in the opposite direction, that is, the phase of the received test tone suddenly jumps in one direction and then suddenly jumps back. In such a case, what appears on the scope is a momentary line trace such as that shown in FIG. 11, followed by another momentary line trace in the opposite direction along the horizontal axis. The bounds of the trace represent the magnitude of the phase hit, in degrees.

Figure 12:
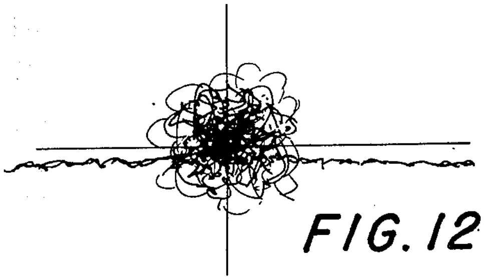

FIG. 12 depicts the observed trace in the case of a phase hit (in one direction, folllowed by the other) in the presence of white noise. The noise continuously appears at the origin of the display, as in the case of FIG. 5. A momentary line, however, extends out of the central noise "blob" whenever a phase hit occurs. In this case, unlike that of FIG. 11, the momentary line trace caused by each phase hit is not clearly defined because of the noise.

Figure 13:
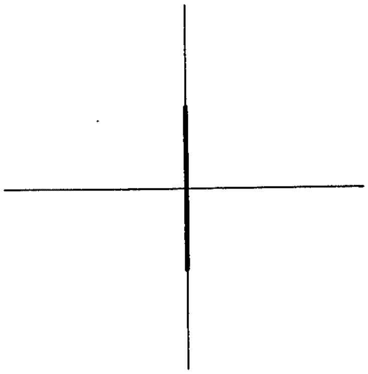

FIG. 13 depicts the form of the display in the case of a gain hit, that is, where the amplitude of the test tone suddenly changes. In this case, a momentary trace appears along the vertical axis of the display. As shown in FIG. 13, the trace extends both up and down from the origin, indicating that the amplitude of the test tone changed suddenly in one direction and then in the other. The amplitude of the gain hit (as a percentage of the amplitude of the received test tone) can be read from the vertical scale. In the presence of noise, the resulting display of a gain hit is comparable to that of FIG. 12, except that the momentary line trace is in the vertical direction.

Figure 14:
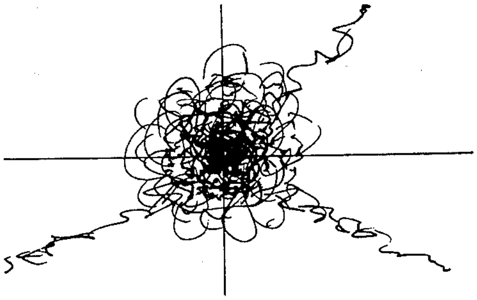

FIG. 14 depicts the type of display which is formed for the case of impulse hits in the presence of background noise. As in several of the other cases, the noise is reflected by a persistent smear at the center of the screen. Each impulse hit results in a momentary line trace, the display of FIG. 14 representing three impulse hits within a relatively short time (the persistence time of the screen). Impulse hits are represented by traces at an arbitrary angle, as opposed to traces substantially along the vertical or horizontal axis, because an impulse is not coherent with or correlated to the test tone. It is the arbitrary angle of an impulse hit on the display which distinguishes it from a gain or a phase hit.

One of the main advantages of the invention is that the only signal source required is a test tone generator, an instrument which is available universally. Furthermore, the test tone itself is not reflected in the display; all that is seen are representations of the disturbances. (In actual practice, several test tones may be transmitted during successive tests, since the disturbances may be a function of frequency.) Simply by using a test tone, the source of a disturbance is visually apparent. Completely different displays result for different types of disturbances, or for different combinations of disturbances. No part of the display is required for a representation of the test tone itself. Since disturbances are usually small relative to a test tone, were the test tone somehow depicted on the display the disturbances would be displayed in a much smaller scale. And by applying in-phase and quadrature disturbance components to orthogonal deflection plates, it is even possible to make quantitative measurements. Furthermore, for a particular modem, it can be established that disturbances within a predetermined circle or ellipse on the display can be tolerated. As long as the displayed disturbances go not go outside the bounds of such a circle or ellipse, it can be verified that a transmission path under test can be used in conjunction with a particular modem.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A transmission path characteristic measuring instrument and display comprising means for processing a received signal having test tone and disturbance components therein to derive a first signal substantially representative of the instantaneous in-phase component of the total disturbance of interest on the received test tone and a second signal substantially representative of the instantaneous quadrature component of the total disturbance of interest on the received test tone, display means having first and second orthogonal input circuits responsive to the application of signals thereto for generating a display, and means for coupling each of said first and second signals to a respective one of said first and second orthogonal input circuits.

2. A transmission path characteristic measuring instrument and display in accordance with claim 1 wherein said processing means is operative to eliminate substantially all of the test tone from each of said first and second signals.

3. A transmission path characteristic measuring instrument and display in accordance with claim 2 wherein said first signal includes two components, one representing the amplitude modulation of the received test tone and the other representing the instantaneous in-phase component of noise on the received test tone.

4. A transmission path characteristic measuring instrument and display in accordance with claim 3 wherein said second signal includes two components, one representing the phase modulation of the received test tone and the other representing the instantaneous quadrature component of noise on the received test tone.

5. A transmission path characteristic measuring instrument and display in accordance with claim 2 wherein each of said first and second signals includes two components, the first component in each of said signals representing a respective one of the amplitude modulation and the phase modulation of the received test tone, and the second component in each of said signals representing a respective one of the instantaneous in-phase and quadrature components of noise on the received test tone.

6. A transmission path characteristic measuring instrument and display in accordance with claim 5 wherein said display means is an oscilloscope.

7. A transmission path characteristic measuring instrument and display in accordance with claim 5 wherein said display means is an oscilloscope having a graticule on the face thereof with orthogonal axes marked to represent phase jitter and amplitude modulation.

8. A transmission path characteristic measuring instrument and display in accordance with claim 7 wherein said graticule further exhibits circles marked to represent disturbance levels.

9. A transmission path characteristic measuring instrument and display in accordance with claim 5 wherein said display means is an oscilloscope having a graticule on the face thereof with circles marked to represent disturbance levels.

10. A transmission path characteristic measuring instrument and display in accordance with claim 1 wherein each of said first and second signals includes two components, the first component in each of said signals representing a respective one of the amplitude modulation and the phase modulation of the received test tone, and the second component in each of said signals representing a respective one of the instantaneous in-phase and quadrature components of noise on the received test tone.

11. A transmission path characteristic measuring instrument and display in accordance with claim 10 wherein said display means is an oscilloscope.

12. A transmission path characteristic measuring instrument and display in accordance with claim 10 wherein said display means has a graticule on the face thereof with orthogonal axes marked to represent phase jitter and amplitude modulation.

13. A transmission path characteristic measuring instrument and display in accordance with claim 12 wherein said graticule further exhibits circles marked to represent disturbance levels.

14. A transmission path characteristic measuring instrument and display in accordance with claim 10 wherein said display means is an oscilloscope having a graticule on the face thereof with circles marked to represent disturbance levels.

15. A transmission path characteristic measuring instrument and display in accordance with claim 2 wherein said processing means derives said first and second signals scaled relative to said display means.

16. A transmission path characteristic measuring instrument and display in accordance with claim 15 wherein said display means is an oscilloscope having a graticule on the face thereof with orthogonal axes calibrated to represent phase jitter and amplitude modulation, said oscilloscope being calibrated so that a display formed thereby permits quantitative values of amplitude modulation and phase jitter to be read from said graticule.

17. A transmission path characteristic measuring instrument and display in accordance with claim 16 wherein said graticule further exhibits circles calibrated to represent disturbance levels.

18. A transmission path characteristic measuring instrument and display in accordance with claim 15 wherein said display means is an oscilloscope having a graticule on the face thereof with circles calibrated to represent disturbance levels.

19. A transmission path characteristic measuring instrument and display in accordance with claim 1 wherein said processing means derives said first and second signals scaled raltive to said display means.

20. A transmission path characteristic measuring instrument and display in accordance with claim 19 wherein each of said first and second signals includes two components, the first component in each of said signals representing a respective one of the amplitude modulation and the phase modulation of the received test tone, and the second component in each of said signals representing a respective one of the instantaneous in-phase and quadrature components of noise on the received test tone.

21. A transmission path characteristic measuring instrument and display in accordance with claim 20 wherein said display means is an oscilloscope.

22. A transmission path characteristic measuring instrument and display in accordance with claim 21 wherein said display means has a graticule on the face thereof with orthogonal axes marked to represent phase jitter and amplitude modulation, said display means being calibrated so that a display formed thereby permits quantitative values of amplitude modulation and phase jitter to be read from said graticule.

23. A transmission path characteristic measuring instrument and display in accordance with claim 22 wherein said graticule further exhibits circles calibrated to represent disturbance levels.

24. A transmission path characteristic measuring instrument and display in accordance with claim 20 wherein said display means is an oscilloscope having a graticule on the face thereof with circles calibrated to represent disturbance levels.

* * * * *